United States Patent [19]
Dickason et al.

[11] 3,752,348
[45] Aug. 14, 1973

[54] MOTOR VEHICLE ELECTRICALLY HEATED WINDSHIELD AND BACKLIGHT SYSTEM

[75] Inventors: Richard T. Dickason, Birmingham; Donald J. Ray, Southgate; Charles D. Simmons, Dearborn Heights, all of Mich.

[73] Assignee: Ford Motor Company, Dearborn, Mich.

[22] Filed: Aug. 30, 1971

[21] Appl. No.: 176,083

[52] U.S. Cl............ 219/203, 52/171, 219/477, 219/522, 219/543, 219/547, 338/308
[51] Int. Cl......... H05b 1/02, H05b 3/26, E06b 7/12
[58] Field of Search............... 219/202, 203, 279, 219/522, 543, 547, 476–480; 338/308, 309; 52/171

[56] References Cited
UNITED STATES PATENTS

| | | | |
|---|---|---|---|
| 3,440,398 | 4/1969 | Nilssen | 219/279 |
| 3,288,983 | 11/1966 | Lear | 219/522 |
| 2,530,980 | 11/1950 | Mershon | 219/203 X |
| 2,158,733 | 5/1939 | Sola | 219/202 X |
| 3,366,777 | 1/1968 | Brittan et al. | 219/203 X |
| 3,475,588 | 10/1969 | McMaster | 219/203 |
| 2,878,357 | 3/1959 | Thomson et al. | 219/203 X |
| 2,898,433 | 8/1959 | Felt | 219/202 X |
| 3,585,358 | 6/1971 | Nilssen | 219/279 |
| 3,576,970 | 5/1971 | Cherry | 219/279 |

FOREIGN PATENTS OR APPLICATIONS

| | | | |
|---|---|---|---|
| 1,206,194 | 9/1970 | Great Britain | 219/203 |
| 1,194,090 | 6/1970 | Great Britain | 219/522 |

*Primary Examiner*—A. Bartis
*Attorney*—Keith L. Zerschling and Robert W. Brown

[57] ABSTRACT

A system is described for electrically heating a motor vehicle windshield and backlight. The system includes a windshield having at least two conductive surfaces and a backlight having at least one conductive surface. Each of the conductive surfaces is provided with a pair of bus bars spaced from one another to permit flow of electrical charge therebetween via the conductive surfaces. This generates heat in the windshield and backlight for defogging and defrosting purposes. The system includes a three phase alternator having the conductive surfaces of the windshield and backlight connected thereto to provide substantially balanced loading of the alternator phases. The alternator may have a field winding supplied by a dc source of electrical energy located in the motor vehicle. A switch connected in series with the field winding may be provided to energize the system. Over-temperature protection for the alternator may be achieved by the provision of a thermostat also connected in series with the alternator field winding.

1 Claim, 4 Drawing Figures

Patented Aug. 14, 1973  3,752,348
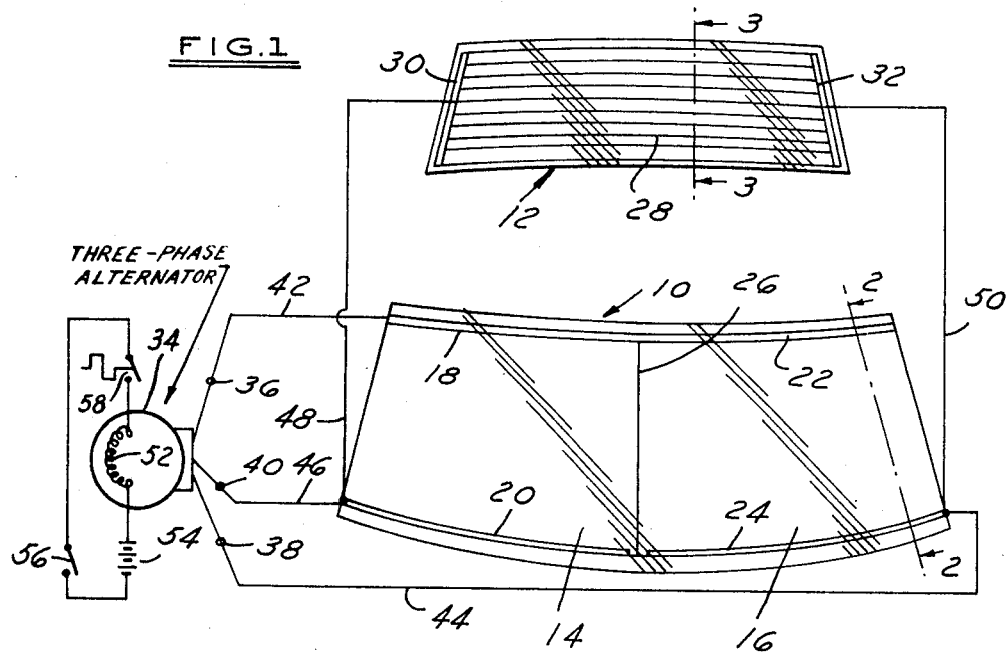
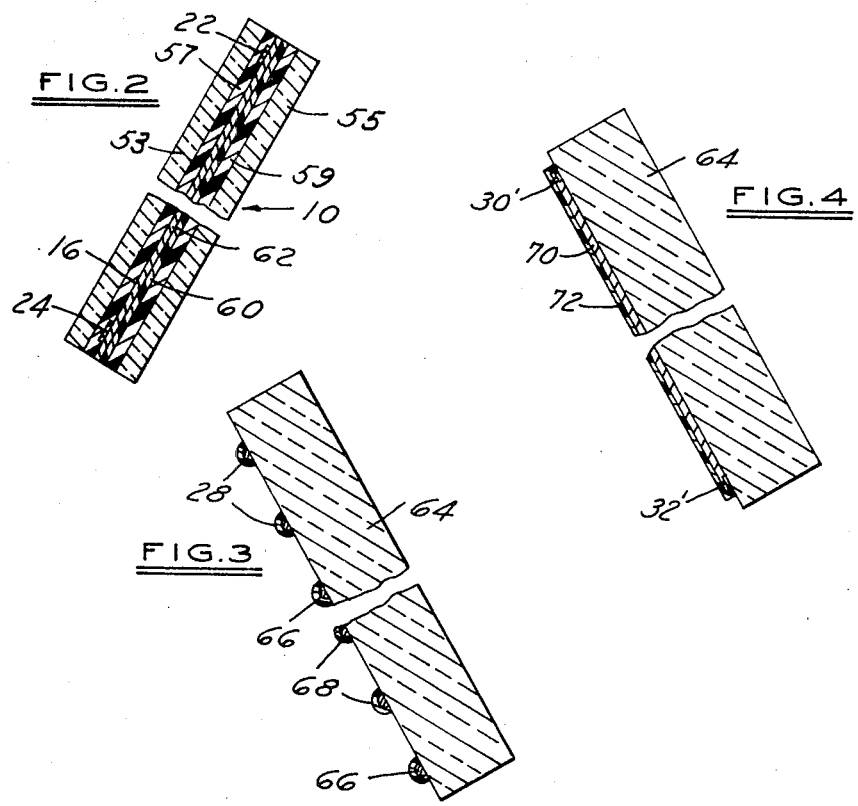

MOTOR VEHICLE ELECTRICALLY HEATED WINDSHIELD AND BACKLIGHT SYSTEM

BACKGROUND OF THE INVENTION

This invention relates to an electrically heated windshield and backlight system for a motor vehicle.

In recent years, electrically heated backlight systems have been developed for motor vehicles for the purpose of defogging and defrosting the backlight. Generally, conventional warm air defogging and defrosting of the vehicle windshield has been retained. In contrast to the prior art, the present invention provides a system for electrically heating both the windshield and the backlight of a motor vehicle.

SUMMARY OF THE INVENTION

In accordance with the invention, an electrically heated windshield and backlight system for a motor vehicle includes a windshield having first and second conductive surfaces. The windshield includes a first pair of bus bars in electrical contact with the first conductive surface, this first pair of bus bars being spaced from one another to permit electrical charge to flow from one to the other via the first conductive surface. The windshield further includes a second pair of bus bars in electrical contact with the second conductive surface, this second pair of bus bars also being spaced from one another to permit electrical charge to flow from one to the other via the second conductive surface. A backlight is provided and includes a third conductive surface and a third pair of bus bars in electrical contact with the third conductive surface. The third pair of bus bars are spaced from one another to permit electrical charge to flow from one to the other via the third conductive surface.

Electrical energy for heating the windshield and backlight is provided by a three-phase alternator having first, second, and third phase winding line terminals. The three-phase alternator may have delta or Y-connected phase windings. Also, if a Y-connection is used, a fourth or neutral terminal at the common junction of the phase windings may be used. Regardless of the type of alternator phase winding connection used, the first line terminal is connected to one bus bar of the first pair of bus bars, the second line terminal is connected to one bus bar of the second pair of bus bars, and the third line terminal is connected to one bus bar of the third pair of bus bars.

If a three-wire Y-connection for the alternator is used (no neutral connection) or if a delta connection is employed, then each of the three conductive surfaces, two in the windshield and one in the backlight, is connected to a different combination of two alternator line terminals. The purpose of this is to achieve substantially balanced loading of the three alternator phases. Balanced loading can also be obtained with a three-phase alternator having three line terminals and a neutral terminal. In such case, each of the three conductive surfaces has one of its bus bars connected to a different line terminal of the alternator and has the other bus bar connected to the neutral terminal of the alternator. Thus, each of the conductive surfaces is connected between a different line terminal and neutral.

It is preferred, but not essential, that the windshield be constructed from laminated glass and that the backlight be constructed from tempered glass.

The term "conductive surface" refers to a surface made electrically conductive either by the use of a continuous electrically conductive film or one made conductive by a grid of electrically conductive lines.

BRIEF DESCRIPTION OF THE DRAWINGS

FIG. 1 is a diagrammatic view of an embodiment of the electrically heated windshield and backlight system of the invention;

FIG. 2 is a sectional view of the windshield taken along the line 2—2 of FIG. 1;

FIG. 3 is a sectional view of the backlight taken along the line 3—3 of FIG. 1; and FIG. 4 is a sectional view of the backlight similar to FIG. 3, but illustrating a different structure for the conductive surface of the backlight.

DETAILED DESCRIPTION OF THE INVENTION

With particular reference now to FIG. 1, an electrically heated windshield and backlight system for a motor vehicle includes a windshield 10 and a backlight 12. The windshield 10 has a first transparent and electrically conductive surface 14 and a second transparent and electrically conductive surface 16. In electrical contact with the first conductive surface 14 of the windshield is a first pair of bus bars 18 and 20 spaced apart from one another to permit electrical charge to flow from one to the other via the first conductive surface. Similarly, the second conductive surface 16 has a second pair of bus bars 22 and 24 electrically connected to it to permit electrical charge to flow from one to the other via the second conductive surface. Because of the electrical arrangement illustrated in FIG. 1, to be described in detail hereinafter, bus bars 18 and 22 may be electrically continuous, that is, they may be connected together as shown in FIG. 1. Preferably, the conductive surfaces 14 and 16 are electrically insulated from one another along a line 26 located in the center of the windshield. This line 36 may be regarded as a line formed by the intersection of an imaginary plane passing vertically through the windshield to divide it into symmetrical halves.

A third conductive surface is located in the backlight 12. This conductive surface is formed by a series of parallel electrically conductive lines 28 running between a third pair of bus bars 30 and 32. The third pair of bus bars 30 and 32 are electrically connected to the conductive surface formed by the grid of parallel conductive lines 28 to permit flow of electrical charge from one of the bus bars to the other via the conductive grid surface.

Electrical energy for the system is supplied by a three-phase alternator 34. The alternator 34 may have its phase windings connected in either a Y or delta configuration. Regardless of which configuration is used, the three-phase alternator will have line (phase winding) terminals. The first line terminal is designated by the numeral 36, while the second and third line terminals are designated by the numerals 38 and 40, respectively.

The first line terminal 36 is electrically connected by conductor 42 to one bus bar 18 of the first pair of bus bars 18 and 20 for the first conductive surface 14. Similarly, the second line terminal 38 is electrically connected by a conductor 44 to one bus bar 24 of the second pair of bus bars 22 and 24 for the second conductive surface 16. The third line terminal 40 is electrically connected by conductors 46 and 48 to one bus bar 30 of the third pair of bus bars 30 and 32 for the third conductive surface located in backlight 12. The conductor 46 also connects the third line terminal 40 to the bus bar 20. Thus, the first conductive surface 14 is electrically connected between the first line terminal 36 and the third line terminal 40. Because bus bars 18 and 22 are electrically continuous, the second conductive surface 16 is electrically connected between the alternator first line terminal 36 and second line terminal 38. A conductor 50 connected to the second line terminal 38 by the conductor 44 is connected to the bus bar 32. Thus, the third conductive surface in the backlight is electrically connected between the alternator second line terminal 38 and third line terminal 40.

The alternator 34 preferably has a field winding 52, the excitation for which is supplied by a dc source of electrical energy 54, such as the motor vehicle storage battery. Control of the field winding current, and hence of the electrical heating system energization, may be obtained by a manually-operated switch 56 connected in series with the field winding. Also, a switch 58 may be provided in the form of a thermostat to electrically disconnect the field winding 52 from its source in the event the alternator becomes overheated. Preferably, the alternator generates 80 to 100 volts between its line terminals and is unregulated. It may be driven by the vehicle's engine, and a clutch connection may be used.

With reference now to FIG. 2, there is shown a sectional view of the windshield 10. The windshield is a laminated structure including an outer glass template 53 and an inner glass template 55. Positioned between the outer and inner glass templates are layers of plastic lamination material 57 and 59. Plastic material 57 and 59 may be made from a conventional material, such as polyvinyl butyral. Positioned between the plastic layers 57 and 59 is a plastic substrate material 60 on which is deposited a conductive film 62. Various materials may be used to form the plastic substrate layer 60. The conductive coating 62 on the substrate layer 60 may be formed by the use of vacuum deposition techniques or the like, these being well known in the art. The resistivity of the conductive coating 62 is chosen so that the resistance heat loss in the laminated structure will be sufficient to perform the defogging and defrosting function for the system.

Reference is made to Canadian Pat. No. 844,570 issued June 16, 1970, and granted to the Sierracin Corporation, Sylmar, California. This patent describes a laminated windshield structure similar to that shown in FIG. 2. Furthermore, it includes detailed information as to this and other laminated structures and materials used in them.

In FIG. 3, there is shown a sectional view of the backlight 12. The backlight 12 is made from a tempered glass template 64 having parallel conductive grid elements 28 thereon. Preferably, the parallel grid elements are on the interior surface of the glass 64. The parallel grid elements 28 preferably are made from a conductive ceramic enamel 66 which is coated with a dielectric material 68, such as an epoxy compound. These parallel grid elements 28 and the bus bars 30 and 32 (FIG. 1) are applied with a silk screen and fired onto the inside surface of the backlight 12. The epoxy coating or other dielectric coating on the conductive element 66 may be applied by silk screen or electrostatic spray techniques.

With reference now to FIG. 4, there is shown an alternative structure for the backlight 12. The structure includes the tempered glass template 64 on which is deposited a transparent conductive film 70. Electrical energy is supplied to the conductive film 70 by means of bus bars 30' and 32'. These bus bars correspond, respectively, to bus bars 30 and 32 of FIG. 1, but they have been repositioned to the top and bottom surfaces of the backlight 12. The conductive film 70 preferably is coated with a transparent, dielectric coating 72.

From the foregoing description of the invention, it is apparent to one skilled in the art that various modifications can be made in the inventive system without departing from the spirit and scope thereof. For example, the number of conductive surfaces in the windshield and backlight can be varied and connected to the three-phase alternator. Also, various modifications can be made in the laminated windshield structure or in the backlight structure.

Based upon the foregoing description of the invention, what is claimed and desired to be protected by Letters Patent is:

1. An electrically heated windshield and backlight system for a motor vehicle, which comprises: a windshield having first and second transparent conductive surfaces, said first and second conductive surfaces being electrically insulated from one another by an imaginary plane passing vertically through said windshield to divide it into symmetrical halves, said windshield including a first pair of bus bars in electrical contact with said first conductive surface, said first pair of bus bars being spaced from one another to permit electrical charge to flow from one to the other via said first conductive surface, and said windshield further including a second pair of bus bars in electrical contact with said second conductive surface, said second pair of bus bars being spaced from one another to permit electrical charge to flow from one to the other via said second conductive surface; a backlight including a third conductive surface and a third pair of bus bars in electrical contact with said third conductive surface, said third pair of bus bars being spaced from one another to permit electrical charge to flow from one to the other via said third conductive surface; and a three-phase alternator having first, second, and third phase winding line terminals, said first conductive surface being electrically connected between said first and third line terminals, said second conductive surface being electrically connected between said first and second line terminals, said third conductive surface being electrically connected between said second and third line terminals, said alternator being driven by the engine of said motor vehicle and generating voltage in excess of 80 volts between its line terminals; thereby to permit said backlight and windshield conductive surfaces to be heated while permitting substantially balanced loading of said alternator if the resistances of each of said conductive surfaces are made substantially equal.

* * * * *